United States Patent Office 3,539,645
Patented Nov. 10, 1970

3,539,645
MANUFACTURE OF HYDROCARBYL HYDROPEROXIDES
Theodore C. Mead, Port Arthur, Tex., and Harry Chafetz, Poughkeepsie, N.Y., assignors to Texaco Inc., New York, N.Y., a corporation of Delaware
No Drawing. Filed Feb. 8, 1968, Ser. No. 703,903
Int. Cl. C07c *73/06, 73/08*
U.S. Cl. 260—610         4 Claims

ABSTRACT OF THE DISCLOSURE

A method of preparing a hydrocarbyl hydroperoxide of the formula:

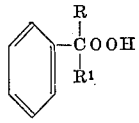

where R and $R^1$ are hydrogen or alkyl of from 1 to 10 carbons and at least one of said R and $R^1$ groups is alkyl, comprising contacting the hydrocarbon of the formula:

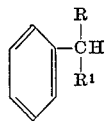

where R and $R^1$ are as heretofore defined with an oxygen-containing gas is the presence of a catalytic combination of an alkali metal halide selected from the group consisting of KF, KBr, KI, NaCl, NaF and KCl and an azobisnitrile of the formula:

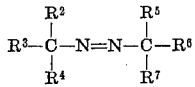

where $R^2$ to $R^7$ are n-alkyl or isoalkyl or isoalkyl of from 1 to 5 carbons.

BACKGROUND OF INVENTION

This invention relates to a field of art pertaining to hydrocarbon hydroperoxides.

In the preparation of hydrocarbyl hydroperoxides of n-hydrocarbons via oxidation with an oxygen-containing gas, certain alkali metal halides such as potassium fluoride were found to be effective in introducing high yields of hydroperoxide product. Although these halides did significantly improve the yield of hydroperoxide product, they do have the disadvantage of somewhat retarding the formation of the hydroperoxide during the initial phases of hydroperoxide production before they accelerate said production.

SUMMARY OF INVENTION

We have discovered, and this constitutes our invention, a method of converting a hydrocarbon to hydrocarbon hydroperoxide wherein the rate of reaction is significantly improved particularly during the initial phases of the reaction. More particularly, we have discovered a method of converting an alkyl substituted benzene to a phenyl substituted alkyl hydroperoxide comprising contacting said hydrocarbon with an oxygen-containing gas in the presence of a combination of an alkali metal halide and an azobisnitrile wherein the rate yield of hydroperoxide is synergistically increased by said combination thereby significantly decreasing the time of reaction for a given yield.

DETAILED DESCRIPTION OF THE INVENTION

Specifically, we have devised a method of preparing a hydrocarbyl hydroperoxide of the formula:

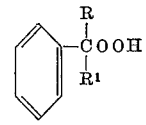

where R and $R^1$ are hydrogen or alkyl of from 1 to 10 carbons and at least one of said R and $R^1$ being alkyl comprising contacting a hydrocarbon of the formula:

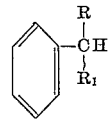

where R and $R^1$ are as heretofore defined with an oxygen-containing gas in the presence of an azobisnitrile of the formula:

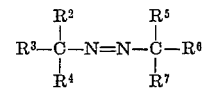

where $R^2$ to $R^7$ are n-alkyl or isoalkyl of from 1 to 5 carbons and an alkali metal halide selected from the group consisting of KF, KBr, KI, NaCl, NaF and KCl at a temperature between about 50 and 350° F. under a pressure of between about 0.1 and 1000 atmospheres utilizing a mole ratio of oxygen to hydrocarbon reactant of at least about 1:10, between about 0.009 and 5 wt. percent of said azobisnitrile and between about 0.1 and 10 wt. percent of said aklali metal halide based on the hydrocarbon reactant.

Under preferred conditions, the temperature of reaction is between about 175–300° F., pressure between about 0.5 and 25 atmospheres, the mole ratio of oxygen to hydrocarbon reactant between about 1:5 and 2:1, the halide is present in an amount between 1 and 5 wt. percent, the nitrile is present in an amount between 0.01 and 2 wt. percent, the alkali metal halide is potassium fluoride, and the azobisnitrile is α,α-azobisisobutyronitrile. Also, under preferred conditions, the reaction ingredients are maintained in an agitated state which is normally accomplished by stirring and/or passing oxygen through the liquid phase of the reaction.

Since the alkali metal halide catalyst is normally present in the solid state during the reaction, it is preferably in a finely divided state, e.g., of a particle size less than 0.5 mm. in order to expose a large surface area per unit weight.

The hydroperoxide product may be recovered by standard means such as by filtration, fractional distillation, selective extraction and combinations thereof.

In the method of the invention it is theorized the alkali metal halide functions to retard the decomposition of the hydrocarbyl hydroperoxide into free radicals. However, free radicals appear to function in a catalytic manner to initiate the formation of additional hydroperoxide. The alkali metal halide thus allows a higher final concentration of hydroperoxide but by lowering the concentration of initiating free radical, the halide initially suppresses the rate of hydroperoxide formation. The azobisnitrile apparently supplies the needed free radical presence in a synergistic interaction with the alkali metal halide in the initial phase of the reaction without deleteriously affecting the higher final concentration of hydroperoxide which is preserved by the alkali metal halide.

Specific examples of the hydrocarbon reactant contemplated herein are cumene, ethylbenzene, sec-butylbenzene, sec-pentylbenzene and 10-phenyleicosane.

Specific examples of the corresponding hydroperoxide product contemplated herein are cumene hydroperoxide, ethylbenzene hydroperoxide, sec-butylbenzene hydroperoxide, sec-pentylbenzene hydroperoxide, and 10-phenyleicosane hydroperoxide wherein the hydroperoxide group is attached to the aliphatic carbon adjacent to the aromatic ring.

Specific examples of the azobisnitriles are:

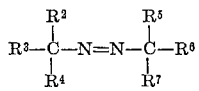

where $R^2$ through $R^7$ are methyl; where $R^2$ through $R^7$ are isopropyl; and where $R^2$, $R^3$, $R^5$ and $R^6$ are methyl and $R^4$ and $R^7$ are ethyl.

Specific examples of the oxygen containing gas employed are pure oxygen, air and synthetic mixtures of oxygen and inert gases such as nitrogen.

The order of alkali metal halide catalyst in terms of decreasing activity is KF, KBr, KI, NaCl, NaF, and KCl.

The formed hydroperoxides are useful as intermediates in the production of hydroxy and keto compounds, for example, the production of acetone and phenol from cumene hydroperoxide.

The following example further illustrates the invention but is not to be considered as limitations thereof.

EXAMPLE I

This example illustrates the method of the invention and the outstanding synergistic effect of the catalytic combination of alkali metal halide and azobisnitrile as defined.

To a 300 milliliter stainless steel autoclave there was charged 43 grams of cumene, 5 grams of potassium fluoride (when employed), and 0.01 gram of α,α'-azobisisobutyronitrile or benzoyl peroxide (when employed). The autoclave was heated to 200° F. over 35 minutes and pressurized to 300 p.s.i. with pure oxygen. The reactor contents were stirred via a magnetic stirrer and maintained at 200° F. for a period of one hour. The reaction mixture was then quenched one hour and five milliliter aliquots were analyzed for cumene hydroperoxide via the standard iodide-thiosulfate method of Wagner, Smith and Peters, Anal. Chem. 19, 979 (1947). In the iodide-thiosulfate method the milliliters of standard thiosulfate required are directly proportional to the cumyl hydroperoxide formed. The normality of the thiosulfate was 0.1.

Six runs were made utilizing the foregoing procedure. Runs A, B, C, D and E are comparative runs and Run F represents the method of the invention. The test data and results are reported below in Table I.

TABLE I

| Run | Free radical initiator | KF, g. | Thiosulfate, mls. |
|---|---|---|---|
| A | None | 0 | 2.2 |
| B | do | 5 | 0.48 |
| C | BP [1] | 0 | 6.2 |
| D | BP [1] | 5 | 7.6 |
| E | ABN [2] | 0 | 16.3 |
| F | ABN [2] | 5 | 36.1 |

[1] Benzoyl peroxide.
[2] Azobisisobutyronitrile.

As can be seen from a comparison of Runs A and B, potassium fluoride, when employed alone actually inhibits the rate of the cumene hydroperoxide production during the early phase of the procedure. Runs C and D demonstrate that other free radical initiators such as benzoyl peroxide when in combination with potassium fluoride merely have an additive effect in producing the desired hydroperoxide product. A comparison of Runs E and F particularly in view of Runs A, B, C, and D clearly establish the synergistic effect of the combination of the alkali metal halide and azobisnitrile as defined on the production of the desired hydrocarbon hydroperoxide.

We claim:
1. A method of producing a hydrocarbyl hydroperoxide of the formula:

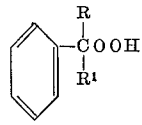

where R and $R^1$ are hydrogen or alkyl of from 1 to 10 carbons and at least one of said R and $R^1$ being alkyl comprising contacting a hydrocarbon of the formula:

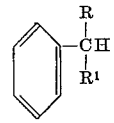

where R and $R^1$ are as heretofore defined with an oxygen containing gas in a mole ratio of oxygen to hydrocarbon of at least about 1:10 in the presence of a catalytic combination of between about 0.009 and 5 wt. percent azobisnitrile of the formula:

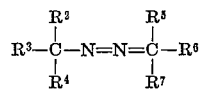

where $R^2$ through $R^7$ are n-alkyl or isoalkyl of from 1 to 5 carbons and between about 0.1 and 10 wt. percent of an alkali metal halide based on the weight of said hydrocarbon selected from the group consisting of potassium fluoride, potassium bromide, potassium iodide, sodium chloride, sodium fluoride, and potassium chloride at a temperature between about 50 and 350° F. under an oxygen pressure of between 0.1 and 1000 atmospheres.

2. A method in accordance with claim 1 wherein said alkali metal halide is potassium fluoride and said azobisnitrile is α,α'-azobisisobutylronitrile.

3. A method in accordance with claim 2 wherein said hydrocarbon is cumene and said hydrocarbyl hydroperoxide is cumene hydroperoxide.

4. A method in accordance with claim 1 wherein said azobisnitrile is present in an amount of between 0.01 and 2 wt. percent, said alkali metal halide is present in an amount of between 1 and 5 wt. percent, said temperature is between 175 and 300° F. and said pressure is between 0.5 and 25 atmospheres.

References Cited

UNITED STATES PATENTS 2,776,999  1/1957  Joris.
2,867,666  1/1959  Erickson et al.
2,776,320  1/1957  Thompson.

BERNARD HELFIN, Primary Examiner

W. B. LONE, Assistant Examiner